US010199633B2

United States Patent
Rios et al.

(10) Patent No.: US 10,199,633 B2
(45) Date of Patent: Feb. 5, 2019

(54) METHOD OF MANUFACTURING HIGH VOLUMETRIC DENSITY ELECTRODES FROM SELF-ALIGNING FIBER POWDERS

(71) Applicant: UT-Battelle, LLC, Oak Ridge, TN (US)

(72) Inventors: Orlando Rios, Knoxville, TN (US); Claus Daniel, Knoxville, TN (US); Nancy J. Dudney, Knoxville, TN (US); Wyatt E. Tenhaeff, Rochester, NY (US)

(73) Assignee: UT-Battelle, LLC, Oak Ridge, TN (US)

( * ) Notice: Subject to any disclaimer, the term of this patent is extended or adjusted under 35 U.S.C. 154(b) by 144 days.

(21) Appl. No.: 14/963,661

(22) Filed: Dec. 9, 2015

(65) Prior Publication Data

US 2017/0170453 A1 Jun. 15, 2017

(51) Int. Cl.
| | | |
|---|---|---|
| *H01M 4/04* | (2006.01) | |
| *H01M 10/0525* | (2010.01) | |
| *H01M 4/62* | (2006.01) | |
| *H01M 4/587* | (2010.01) | |
| *H01M 4/38* | (2006.01) | |
| *H01M 4/1393* | (2010.01) | |
| *H01G 11/30* | (2013.01) | |
| *H01M 4/1395* | (2010.01) | |

(52) U.S. Cl.
CPC .......... *H01M 4/0409* (2013.01); *H01G 11/30* (2013.01); *H01M 4/0404* (2013.01); *H01M 4/0435* (2013.01); *H01M 4/1393* (2013.01); *H01M 4/1395* (2013.01); *H01M 4/386* (2013.01); *H01M 4/587* (2013.01); *H01M 4/623* (2013.01); *H01M 10/0525* (2013.01)

(58) Field of Classification Search
None
See application file for complete search history.

(56) References Cited

U.S. PATENT DOCUMENTS

| | | |
|---|---|---|
| 6,863,942 B2 | 3/2005 | Ren et al. |
| 7,851,238 B2 | 12/2010 | Mitchell et al. |
| 8,101,298 B2 | 1/2012 | Green et al. |
| 2011/0274976 A1 | 11/2011 | Blomgren et al. |
| 2012/0110835 A1 | 5/2012 | Hudson et al. |

(Continued)

FOREIGN PATENT DOCUMENTS

JP 2012-069546 4/2012

OTHER PUBLICATIONS

Tenhaeff, Wyatt et al., "Highly Robust Lithium Ion Battery Anodes from Lignin: An Abundant, Renewable, and Low-Cost Material", Advanced Functional Materials 2013, pp. 1-9.

*Primary Examiner* — Wyatt P McConnnell
(74) *Attorney, Agent, or Firm* — Warner Norcross + Judd LLP

(57) ABSTRACT

An electrode and a related method of manufacture are provided. The electrode includes a self-aligning active material having short fiber powders with a cylindrical morphology to increase the packing density from 0.74 to nearly 0.91. The short fiber powders self-align during a slurring coating process as a result of shear forces between a die and a foil. The resulting coating includes parallel short fibers in a closed packed arrangement, providing an increased volumetric capacity of at least approximately 17%.

12 Claims, 3 Drawing Sheets

(56) References Cited

U.S. PATENT DOCUMENTS

| | | |
|---|---|---|
| 2013/0130116 A1 | 5/2013 | Ryu et al. |
| 2013/0143087 A1 | 6/2013 | Liu et al. |
| 2014/0038034 A1* | 2/2014 | Rios .................. H01M 4/133 |
| | | 429/188 |
| 2014/0038042 A1 | 2/2014 | Rios et al. |

* cited by examiner

METHOD OF MANUFACTURING HIGH VOLUMETRIC DENSITY ELECTRODES FROM SELF-ALIGNING FIBER POWDERS

This invention was made with government support under Contract No. DE-AC05-00OR22725 awarded by the U.S. Department of Energy. The government has certain rights in the invention.

BACKGROUND OF THE INVENTION

The present invention relates to electrodes, and more particularly, methods for manufacturing electrodes for batteries and other electrical energy storage devices.

Rechargeable batteries are accepted in a growing number of applications. Rechargeable lithium-ion batteries, for example, are prevalent in consumer electrics, power tools, electric vehicles, and aerospace applications. The success of the lithium-ion battery is at least partially attributable to a high charge density and a small loss of charge when not in use. The possibility to reduce the size of lithium-ion batteries, and other electrical energy storage devices, has generated increased interest in improvements in anode and cathode technology.

In many commercial applications, battery electrodes are formed from powder-based slurries. For example, battery electrodes can be produced from organic or aqueous-based slurries that are coated onto a metallic current collector. The slurries typically consist of active materials, conductive additives, a polymeric binder, and a solvent. The active materials are in the form of individual particles with a roughly spherical morphology. The maximum packing density for spherical morphology particles of equal diameter is 0.74 for cubic or hexagonal close packing. Further improvements in the packing density are possible by placing smaller particles into the interstitial spaces between the spherical morphology particles of equal diameter. Filling the interstitial spaces with smaller particles is difficult from a manufacturing standpoint, increases cost, increases processing and significantly increases tortuosity however.

Accordingly, there remains a continued need for an electrode with an improved packing density of an active material while mitigating the effects of tortuosity on rate performance, including electrodes for batteries and other applications.

SUMMARY OF THE INVENTION

An electrode and a related method of manufacture are provided. The electrode includes a self-aligning active material having short fiber powders with a cylindrical morphology to increase the packing density to 0.91. The short fiber powders self-align during a slurring coating process as a result of shear forces between a die and a foil for example. The coating includes substantially aligned short fiber powders in a closed packed arrangement, providing a 17% increase in volumetric capacity.

In one embodiment, a method for manufacturing the electrode includes preparing a slurry containing an active material, coating a substrate with the slurry while fiber powders within the coating self-align due to shear forces, and calendaring the coating once cured to produce an electrode having a packing density of at least 0.75. Coating the substrate can include slurry coating or roll coating the slurry onto the substrate such that a blade, a die, or a roller imparts shear forces to the coating. Curing the coating can remove solvents and calendaring the resulting dry coating can achieve an electrode thickness of between about 10 μm to 150 μm, inclusive.

In another embodiment, the slurry includes an active material, a polymeric binder, and a solvent. The active material can include silicon-carbon powders having a cylindrical morphology with an average particle diameter of 1-100 μm and an aspect ratio of 1:5 to 1:100. The polymeric binder can include poly(vinylidene difluoride) and the solvent can include anhydrous N-methyl pyrrolidinone. Other active materials, polymeric binders, and solvents can be used in other embodiments where desired.

In still another embodiment, the active material can be formed by melt blowing fibers onto a substrate, oxidatively stabilizing the melt blown fibers by heating the fibers, and carbonizing the fibers in an annealing temperature of an inert gas. The resulting lignin-based carbon fiber mat is then ground into short fiber powders having a cylindrical morphology with an average particle diameter of 1-100 μm and an aspect ratio of 1:5 to 1:100. The active material is then mixed with a solvent and a polymeric binder before coating on a substrate, for example a metal foil, as noted above.

The method of the present invention can provide high packing density architectures for battery electrodes through the use of self-aligning fiber powders. The aspect ratio of these short fibers can result in self-alignment that increases the packing density of the constituents of the coating without increasing manufacturing costs or processing times. Fabrication of the short fiber morphology is also compatible with low-coat melt processing techniques and other extrusion methods. The self-aligning powders can include improved packing density while mitigating the deleterious effects of tortuosity on rate performance as found in existing battery electrodes.

These and other features and advantages of the present invention will become apparent from the following description of the invention, when viewed in accordance with the accompanying drawings and appended claims.

DETAILED DESCRIPTION OF THE CURRENT EMBODIMENTS

The invention as contemplated and disclosed herein includes an electrode and a related method of manufacture. As set forth below, the electrode includes a self-aligning active material having short fiber powders with a cylindrical morphology. The short fiber powders self-align during a coating process as a result of shear forces between a die and a foil, for example. The resulting closed packed arrangement can provide improved packing density without increasing manufacturing costs or processing times.

Figure 1:
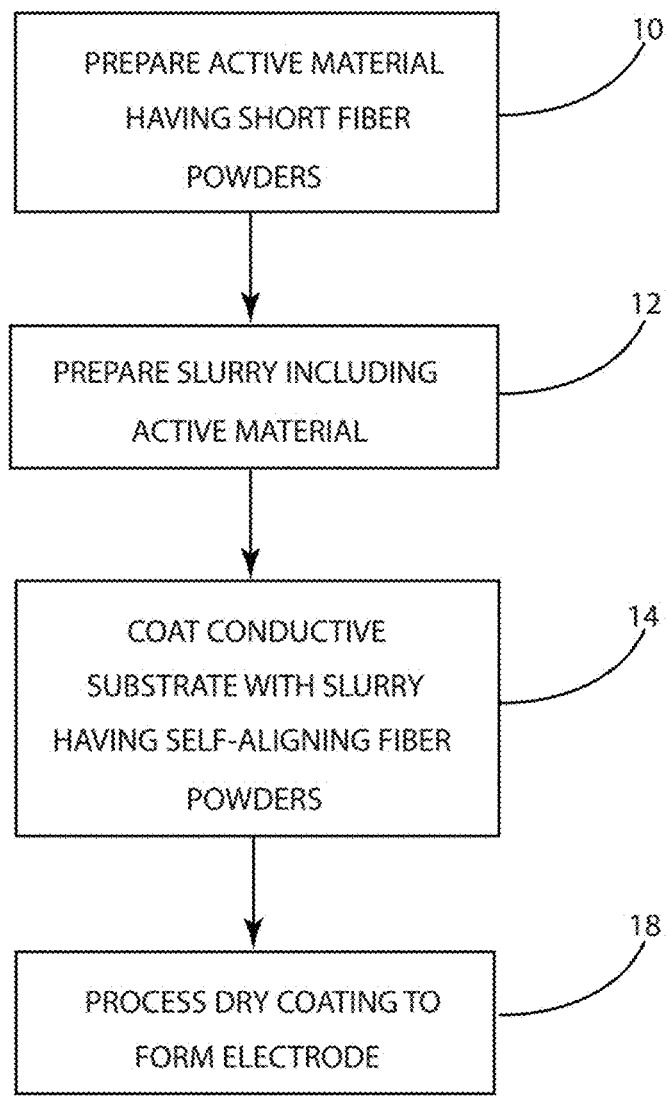
FIG. 1 is a flow diagram of a method of manufacturing an electrode in accordance with one embodiment of the invention.

Referring now to FIG. 1, a flow chart illustrating a method for manufacturing an electrode in accordance with one embodiment is presented. In general terms, the method can include the following steps: a) preparing an active material including short fiber powders, b) preparing a slurry containing the active material, a solvent, and a binder, c) applying the slurry to a substrate to form a coating with shear forces that substantially align the short fiber powders, and d) further processing the coated substrate to produce an electrode. Each of these steps is discussed below.

Preparing an active material is depicted as step 10 in FIG. 1. This step generally includes preparing fiber powders having a cylindrical morphology. The fiber powders can be silicon-carbon fibers or lignin-based carbon fibers, for example. Preparing silicon-carbon fiber powders is described in US Patent Application Publication 2014/0038042 to Rios et al, the disclosure of which is incorporated by reference in its entirety. Preparing lignin-based carbon fibers is described in US Patent Application Publication 2014/0038034 to Rios et al., and *Highly Robust Lithium Ion Battery Anodes from Lignin: An Abundant, Renewable, and Low Cost Material* by Tanheaff et al, 24 Adv. Funct. Mater., p. 86-94 (2014), the disclosures of which are incorporated by reference in their entirety. The lignin-based fibers can be formed by melt-blowing fibers onto a substrate. The melt-blown fibers are stabilized by heating the fibers to a desired temperature and at a desired rate. In one embodiment, the melt-blown fibers are heated to 250° C. at a rate of between 0.01° C./min and 1.0° C./min. Other heating profiles can be used in other embodiments as desired. The fibers are then carbonized at a suitable annealing temperature, for example 1000° C., while in an inert gas, for example argon, thereby forming a lignin-based carbon fiber mat.

Preparation of the active material also includes grinding the mat into powders having a cylindrical morphology. As used herein, powders having a "cylindrical morphology" include fiber powders having a length at least three times a diameter (e.g., being non-spherical). In one embodiment, the powders include an aspect ratio (the ratio of width to length) of 1:5 to 1:100 inclusive, further optionally 1:20 to 1:85 inclusive, and still further optionally 1:40 to 1:60 inclusive. The powders can have other aspect ratios in other embodiments as desired. Further by example, powders having a cylindrical morphology can include powders having a generally circular or oval cross-section whose sidewalls are generally straight in the longitudinal direction. The powders can include a mean diameter of between 1 μm and 100 μm inclusive, optionally between 20 μm and 80 μm inclusive, and further optionally between 40 μm and 60 μm inclusive.

Preparing a slurry including the active material is depicted as step 12 in FIG. 1. This step can include mixing the active material, a binder, and a solvent. The binder can include a polymeric binder, for example polyvinylidene difluoride (PVDF), but can include other binders in other embodiments as desired. The solvent can include an organic solvent, for example anhydrous N-methyl pyrrolidinone (NMP), but can include other solvents in other embodiments as desired. The solvent is in many embodiments ultimately extracted from the slurry after coating on a current collector, although in some embodiments the solvent is omitted from the slurry altogether. The slurry can also include additives, for example carbon black in some embodiments.

Figure 4:
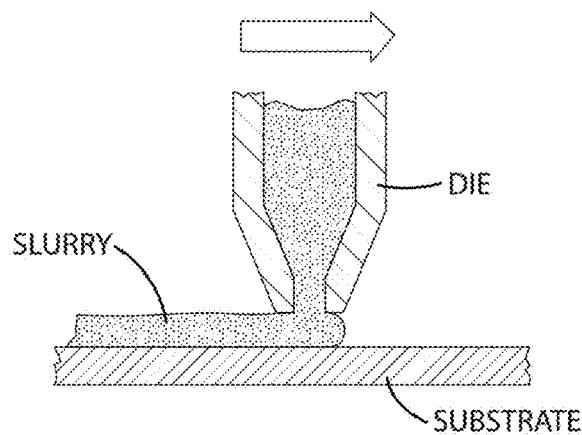
FIG. 4 is an illustration of a die-coated slurry in accordance with an embodiment of the present invention.
Figure 5:
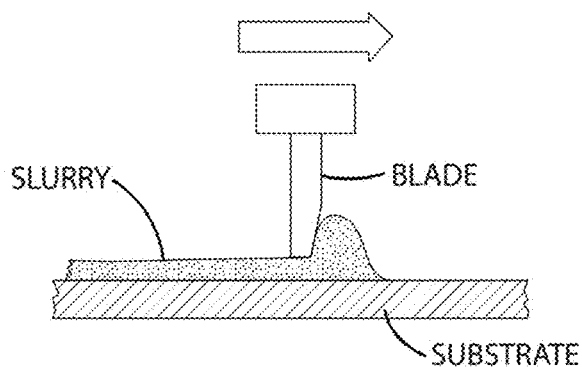
FIG. 5 is an illustration of a blade-coated slurry in accordance with an embodiment of the present invention.
Figure 6:
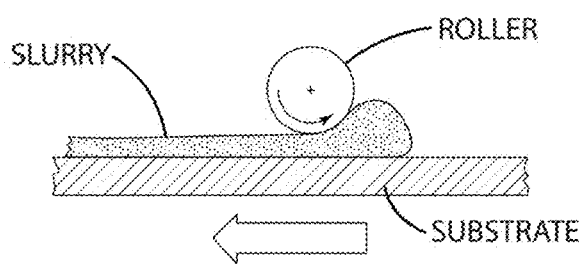
FIG. 6 is an illustration of a roll-coated slurry in accordance with an embodiment of the present invention.

Applying the slurry to a substrate to form a coating is depicted as step 14 in FIG. 1. This step generally includes continuously coating the paste-like slurry onto the substrate, optionally a current collector substrate. The slurry can be applied according to any technique in which a shear force is applied to the slurry, thereby causing the carbon-fiber powders to self-align. For example, the slurry can be applied according to a slurry coating method, in which a slot die (see, e.g., FIG. 4) or a doctor blade (see, e.g., FIG. 5) applies a length-wise shear force across the width of the substrate as the slurry is deposited. Further by example, the slurry can be applied according to a roll coating method (see, e.g., FIG. 6), in which a roller applies a length-wise shear force across the width of the substrate as the slurry is deposited. Other coating techniques can be used in other embodiments as desired. The wet coating can have a thickness of between 4 and 6 mil in some embodiments, but can have a thickness outside of this range in other embodiments. The underlying substrate can include an electrically conductive material, for example a metal foil, and can be porous or substantially non-porous. The metal foil can include copper in some embodiments, while in other embodiments the metal foil includes aluminum for example. The thickness of the metal foil can be between 1 μm and 20 μm, optionally 12 μm. The metal foil optionally forms the current collector of a rechargeable battery as discussed in greater detail below.

Figure 2:
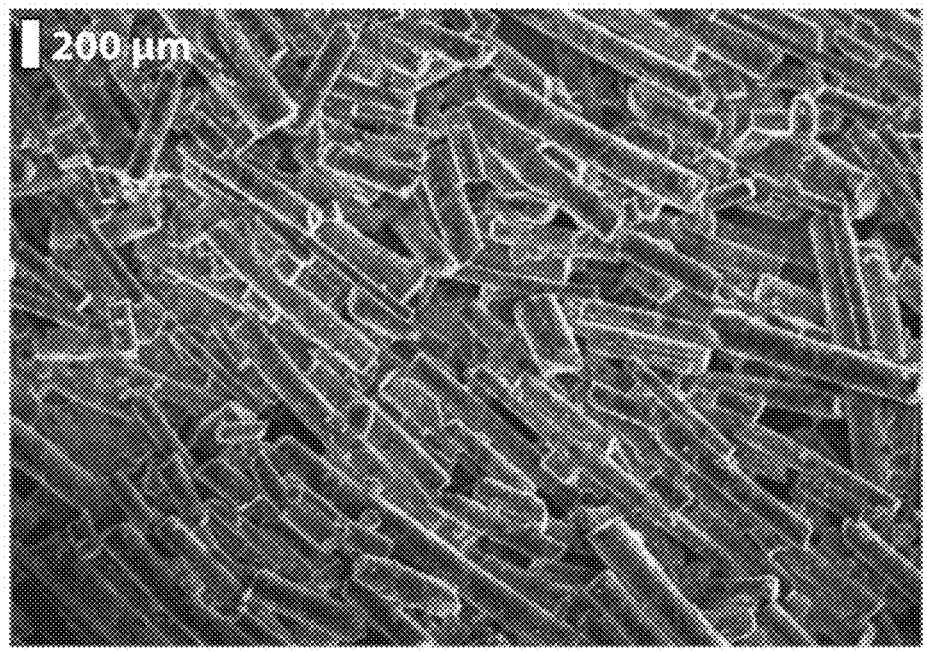
FIG. 2 is an electron microscopy image of substantially aligned fiber powders for an electrode prepared according to the method of FIG. 1.

As noted above, the application of the slurry to the substrate can cause the carbon-fiber powders to substantially self-align. As used herein, "substantially self-align" or "substantial alignment" means the carbon-fiber powders are more aligned than not aligned, e.g., sharing substantially the same orientation and not randomly oriented. An example of carbon-fiber in substantial alignment is depicted in FIG. 2. Substantial alignment can also be achieved apart from the step of coating the substrate with the slurry. In one embodiment, a die, a blade, or a roller (or other shear element) is drawn across the slurry coating to substantially align the carbon-fiber powders in the active material, the slurry coating having previously been applied to the substrate. In this embodiment, the die, the blade or the roller moves relative to a stationary substrate, while in other embodiments a substrate moves relative to a stationary die, a blade or a roller.

Further processing the coated substrate can include removing the solvent and thereafter calendaring the coating. The solvent can be removed according to any desired technique. In one embodiment, the solvent is removed by drying the wet coating in a moisture-free environment to eliminate absorbed water. The solvent can be removed according to other techniques in other embodiments as desired. Calendaring the resulting dry coating can increase the volumetric density of the active material. The resulting thickness of the dry coating can be between about 10 μm and 150 μm inclusive, optionally between 40 μm and 120 μm inclusive, and further optionally 60 μm. The dry coating can have thicknesses within or outside of these ranges in other embodiments as desired.

Figure 3:
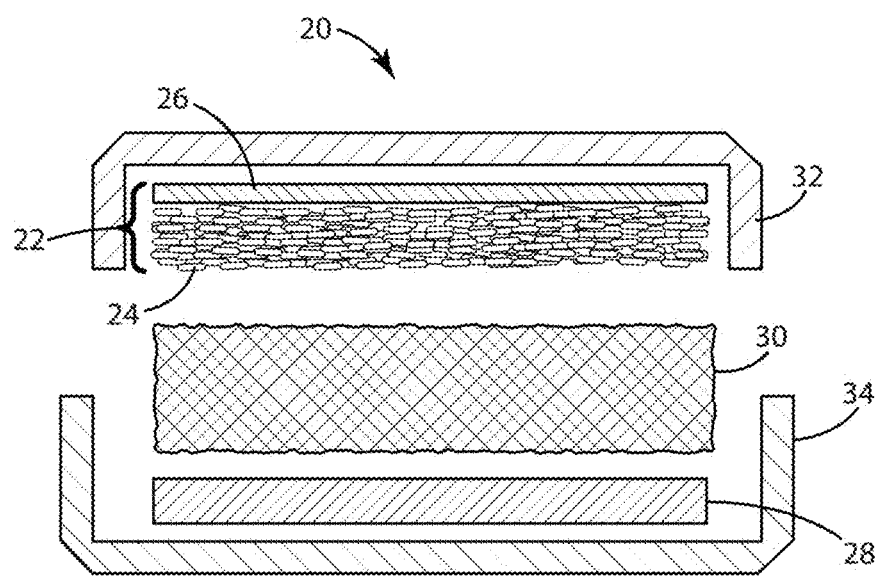
FIG. 3 is an illustration of a rechargeable battery including an anode prepared according to the method of FIG. 1.

The resulting electrode can include an electrically conductive substrate and a dry coating having an active material with short fiber powders defining a cylindrical morphology. The short fiber powders can include an average particle diameter of between 1 μm and 100 μm inclusive, optionally between 20 μm and 80 μm inclusive, and further optionally between 40 μm and 60 μm inclusive. A battery 20 including an electrode formed according to the method of the present invention is depicted in FIG. 3. The battery 20 includes an anode 22 having an active material 24 and a current collector 26, for example a copper foil, the anode 22 being opposite of a cathode 28. The battery 20 additionally includes an electrolyte-saturated porous separator 30 between the anode 22 and cathode 28. Together, the anode 22 and the cathode 28 form part of a rechargeable battery 20 (within housing members 32, 34) having an improved volumetric density over existing devices.

To reiterate, the method of the current embodiments includes preparing a slurry containing an active material, coating a substrate with the slurry while fiber powders within the coating self-align due to shear forces, and calendaring the coating once cured to produce an electrode having a packing density of greater than 0.74. Coating the substrate can include slurry coating or roll coating the slurry while fiber powders within the coating substantially self-align due to shear forces. The aspect ratio of these short fibers can contribute to self-alignment and increase packing density without increasing manufacturing costs or processing times and while mitigating the deleterious effects of tortuosity on rate performance as found in existing battery electrodes.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method of making an electrode comprising the steps of:
    forming a carbon fiber mat by melt blowing fibers onto a substrate, oxidatively stabilizing the melt blown fibers by heating the fibers to 250° C. at a rate of between 0.01° C./min and 1.0° C./min, and carbonizing the fibers in an annealing temperature of at least 1000° C. in an inert gas;
    grinding the carbon fiber mat into powders having a cylindrical morphology with an average particle diameter of 1-100 μm and an aspect ratio of 1:20 to 1:85 inclusive;
    preparing a slurry containing at least the powders and a polymeric binder;
    depositing the slurry onto a substrate to form a coating while applying a shear force to the coating to substantially align the powders within the coating; and
    further processing the coated substrate to produce an electrode, wherein the powders have a packing density of at least 0.75.

2. The method according to claim 1 wherein the slurry includes a solvent, the method further including removing the solvent from the slurry to achieve a dry coating and calendaring the dry coating.

3. The method according to claim 1 wherein further processing the coated substrate includes incorporating the coated substrate into a lithium-ion battery as an anode.

4. The method according to claim 1 wherein applying a shear force to the coating includes drawing a die, a blade, or a roller along the coating.

5. The method according to claim 1 wherein the carbon fiber mat includes lignin-based carbon fibers or silicon-carbon fibers.

6. The method according to claim 1 wherein the polymeric binder includes poly(vinylidene difluoride).

7. The method according to claim 2 wherein the solvent includes ahhydrous N-methyl pyrrolidinone.

8. A method of making an electrode comprising the steps of:
    forming a carbon fiber mat by melt blowing fibers onto a substrate, oxidatively stabilizing the melt blown fibers by heating the fibers to 250° C. at a rate of between 0.01° C./min and 1.0° C./min, and carbonizing the fibers in an annealing temperature of at least 1000° C. in an inert gas;
    grinding the carbon fiber mat into fiber powders having a cylindrical morphology with an average particle diameter of 1-100 μm and an aspect ratio of 1:20 to 1:85 inclusive;
    preparing a slurry including the fiber powders, a binder, and a solvent;
    applying the slurry to a substrate to form a wet coating and drawing a shear element along the wet coating to substantially align the fiber powders therein; and
    curing the wet coating to form a dry coating on the substrate, the dry coating having a fiber powder packing density of between 0.75 and 0.91.

9. The method according to claim 8 wherein the polymeric binder includes poly(vinylidene difluoride).

10. The method according to claim 8 wherein the solvent includes ahhydrous N-methyl pyrrolidinone.

11. The method according to claim 8 further including calendaring the dry coating to achieve a thickness of between 10 μm to 150 μm.

12. The method according to claim 8 wherein curing the wet coating removes residual adsorbed moisture therefrom.

* * * * *